(12) United States Patent
Bitto et al.

(10) Patent No.: US 7,143,655 B2
(45) Date of Patent: *Dec. 5, 2006

(54) MAGNETIC CIRCUIT ARRANGEMENT FOR A TRANSDUCER

(75) Inventors: Ennio Bitto, Aesch (CH); Christian Schutze, Basel (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/078,312

(22) Filed: Mar. 14, 2005

(65) Prior Publication Data

US 2005/0155437 A1    Jul. 21, 2005

Related U.S. Application Data

(63) Continuation of application No. 10/132,408, filed on Apr. 26, 2002, now Pat. No. 6,883,387.

(60) Provisional application No. 60/286,546, filed on Apr. 27, 2001.

(30) Foreign Application Priority Data

Apr. 26, 2001    (EP)    .................................. 01110378

(51) Int. Cl.
*G01F 1/84*    (2006.01)

(52) U.S. Cl. ............................................... 73/861.355
(58) Field of Classification Search ........... 73/861.355, 73/861.354, 861.356
See application file for complete search history.

(56) References Cited

U.S. PATENT DOCUMENTS 6,047,718 A * 4/2000 Konsky et al. ................. 137/1
6,883,387 B1 * 4/2005 Bitto et al. ............ 73/861.355

\* cited by examiner

*Primary Examiner*—Jewel Thompson
(74) *Attorney, Agent, or Firm*—Bacon & Thomas

(57) ABSTRACT

The magnetic circuit arrangement, which is preferably used in a fluid-measuring transducer, comprises at least one coil which is traversed in operation by a current. It further comprises two armatures that are fixed to two flow tubes vibrating in phase opposition. The coil is float-mounted by means of a holder to a double flow tube configuration formed by the flow tubes. The armatures are shaped and aligned relative to each other in such a manner that magnetic fields produced by means of the magnetic circuit arrangement are essentially concentrated within the magnetic circuit arrangement, whereby the latter is also largely insensitive to extraneous magnetic fields. The magnetic circuit arrangement is marked by a long service life and, particularly if the transducer is used for fluids with high and/or varying temperatures, by constantly high accuracy in operation.

11 Claims, 4 Drawing Sheets

MAGNETIC CIRCUIT ARRANGEMENT FOR A TRANSDUCER

This application is a Continuation Application of application Ser. No. 10/132,408, filed Apr. 26, 2002, now U.S. Pat. No. 6,883,387 which in turn is based on Provisional Application No. 60/286,546, filed Apr. 27, 2001.

FIELD OF THE INVENTION

This invention relates to a magnetic circuit arrangement for use in a vibratory transducer and particularly in a Coriolis mass flow sensor.

BACKGROUND OF THE INVENTION

To determine the mass flow rate a fluid flowing in a pipe and particularly of a liquid, use is frequently made of Coriolis mass flowmeters, which, as is well known, induce Coriolis forces in the fluid and derive therefrom a measurement signal representative of mass flow rate by means of a vibratory transducer and control and evaluation electronics connected thereto.

Such Coriolis mass flowmeters have been known and in industrial use for a long time. For example, U.S. Pat. Nos. 4,756,198, 4,801,897, 5,048,350, 5,301,557, 5,349,872, 5,394,758, 5,796,011, and 6,138,517 as well as EP-A 803 713 disclose Coriolis mass flowmeters incorporating a transducer which comprises:
a double flow tube configuration communicating with the pipe and comprising
a first flow tube, which vibrates in operation, and
a second flow tube, which vibrates in operation,
the first and second flow tubes vibrating in phase opposition;
a vibration exciter for driving the flow tubes; and
vibration sensors for detecting inlet-side and outlet-side vibrations of the flow tubes and for producing at least one electric sensor signal influenced by the mass flow rate,
the vibration exciter and/or the vibration sensors having at least one magnetic circuit arrangement for converting electric into mechanical energy and/or vice versa which comprises:
at least one coil which is traversed at least temporarily by a current and penetrated at least temporarily by a magnetic field;
a first armature, fixed to the first vibrating flow tube of the transducer;
a second armature, fixed to the second vibrating flow tube of the transducer; and
a holder for the coil.

As is well known, bent or straight flow tubes of such transducers, if excited in the so-called useful mode into flexural vibrations according to a first natural vibration mode shape, can cause Coriolis forces in the fluid passing therethrough. These, in turn, result in coplanar flexural vibrations being superimposed on the excited flexural vibrations of the useful mode in the so-called Coriolis mode, so that the vibrations detected by the vibration sensors at the inlet and outlet ends have a measurable phase difference, which is also dependent on the mass flow rate of the fluid.

In operation, the flow tubes of the transducer are usually excited at an instantaneous resonance frequency of the first natural vibration mode, particularly with the vibration amplitude maintained constant. As this resonance frequency is also dependent on the instantaneous density of the fluid in particular, commercially available Coriolis mass flowmeters can also be used to measure the density of moving fluids.

In magnetic circuit arrangements as disclosed in U.S. Pat. No. 5,048,350, both the armature and the associated coil are fixed directly to the double flow tube configuration, so that in operation, both, following the motions of the associated flow tubes, are practically permanently accelerated. The resulting inertial forces, which affect particularly the coil, may lie in ranges far above 10 G (=weight). Even inertial forces up to 30 G are nothing unusual. Because of these high mechanical stresses, the coils in such magnetic circuit arrangements, and particularly their windings, must be highly loadable to ensure a long life of the vibration exciters, particularly a high number of vibration cycles, with unchanged accuracy in operation.

In magnetic circuit arrangements as disclosed in U.S. Pat. Nos. 4,756,198, 5,349,872, or 6,138,517, for example, such mechanical stress on coils is avoided by holding each of the latter in a holding structure that is at rest relative to the vibrating flow tubes, such as a support plate, a meter housing, or a support frame flexibly attached directly to the flow tubes, at a nearly constant distance from a centroidal axis, here a vertical axis, of the double flow tube arrangement.

It turned out, however, that although the above-described mechanical stresses can thus be virtually completely eliminated, the accuracy of such a magnetic circuit arrangement may be seriously affected by, particularly temperature-induced, shifts between the holding structure and the double flow tube configuration as occur, for example, in applications for fluids with widely varying temperatures. Because of the resulting different expansion of the holding structure and the double flow t tube configuration, which are neutralizable only limitedly, the rest positions of armature and coil change relative to each other.

While in the magnetic circuit arrangement according to U.S. Pat. No. 6,138,517, mainly a very great temperature difference, and thus a very great expansion difference, may occur between holding structure and double flow tube configuration, in the magnetic circuit arrangements described in U.S. Pat. No. 5,349,872, whose magnetic fields, particularly in the areas of the armatures, are highly inhomogeneous, even slight disturbances may result in considerable inaccuracy. As a result, e.g., if the arrangement is used as a vibration sensor, the sensor signals may have a very poor signal-to-noise ratio and/or exhibit very high harmonic distortion. Furthermore, the magnetic field of a magnetic circuit arrangement as disclosed in U.S. Pat. No. 5,349,872 may act through a very large region, i.e., it may also penetrate adjacent components of the transducer and particularly other such magnetic circuit arrangements and/or the flow tubes with the fluid passing therethrough, thus inducing interference voltages, for example. Further disadvantages of such a magnetic circuit arrangement are discussed in detail in U.S. Pat. No. 6,138,517, for example.

To ensure high accuracy in operation despite those temperature-induced interfering effects on the aforementioned magnetic circuit arrangements, the large amount of technical complexity required in such mass flowmeters to compensate for temperature-dependent interferences has to be increased even further.

It is therefore an object of the invention to provide a magnetic circuit arrangement, particularly an arrangement for use in a fluid-measuring vibratory transducer, which has a long service life and particularly a high number of vibration cycles, and which, particularly if the transducer is used for fluids with high and/or varying temperatures, has constantly high accuracy in operation. In addition, the magnetic circuit arrangement according to the invention is to be insensitive to extraneous magnetic fields.

SUMMARY OF THE INVENTION

To attain the object, the invention provides a magnetic circuit arrangement for converting electric into mechanical energy and/or vice versa which comprises:
- at least a first coil, traversed in operation by a current;
- a first armature, fixed to a first vibrating flow tube of a transducer;
- a second armature, fixed to a second vibrating flow tube of the transducer; and
- a holder for the first coil, fixed to the first and second flow tubes,
- the two armatures being shaped and aligned relative to each other in such a way that magnetic fields produced by means of the magnetic circuit arrangement are essentially concentrated within the magnetic circuit arrangement, and
- the first coil and at least the first armature interacting via a first magnetic field.

In a first preferred embodiment of the invention, the magnetic circuit arrangement comprises a second coil traversed in operation by a current, the second coil and the second armature interacting via a second magnetic field.

In a second preferred embodiment of the invention, at least the first armature is shaped and aligned relative to the first coil in such a way that the first magnetic field spreads homogeneously at least at the side of the coil and essentially in alignment with a central axis of the coil.

In a third preferred embodiment of the invention, each of the two armatures is cup-shaped.

In a fourth preferred embodiment of the invention, the first coil is wound on a first core, and the first core and the first armature are shaped and aligned relative to each other in such a way that the magnetic flux passes through an air gap formed between the two.

In a fifth preferred embodiment of the invention, each of the two cores is cup-shaped.

In a sixth preferred embodiment of the invention, the holder comprises a support plate for holding the at least first coil, the support plate being float-mounted by means of a resilient first leg, fixed to the first flow tube, and a resilient second leg, fixed to the second flow tube, to a double flow tube configuration formed by the two flow tubes.

In a seventh preferred embodiment of the invention, the support plate, extending along the double flow tube configuration, is fixed to the first and second flow tubes at the inlet and outlet ends thereof.

In an eighth preferred embodiment of the invention, the transducer is a Coriolis mass flow sensor.

In a ninth preferred embodiment of the invention, the magnetic circuit arrangement serves as a vibration exciter for driving the flow tube.

In a tenth preferred embodiment of the invention, the magnetic circuit arrangement serves as a vibration sensor for detecting vibrations of the flow tubes.

A fundamental idea of the invention is, on the one hand, to design at least one of the magnetic circuit arrangements commonly used in such transducers and particularly in Coriolis mass flow sensors or Coriolis mass flow/density sensors, i.e., the vibration exciter and/or the vibration sensors, in such a way that in operation, their coils remain in a rest position at least relative to a centroidal axis of the double flow tube configuration, particularly to the vertical axis of the latter. On the other hand, the invention is aimed at providing a magnetic circuit arrangement that is largely insensitive to temperature influences and whose magnetic field can be prevented from acting on other components while the arrangement itself is effectively shielded from other magnetic fields.

BRIEF DESCRIPTION OF THE DRAWINGS

The invention and further advantages will become more apparent by reference to the following description of embodiments taken in conjunction with the accompanying drawings. Like reference characters have been used to designate like parts throughout the various figures; reference characters-that-were already used in preceding figures are not repeated in subsequent figures if this contributes to clarity. In the drawings.

DESCRIPTION OF THE PREFERRED EMBODIMENTS

Figure 1:
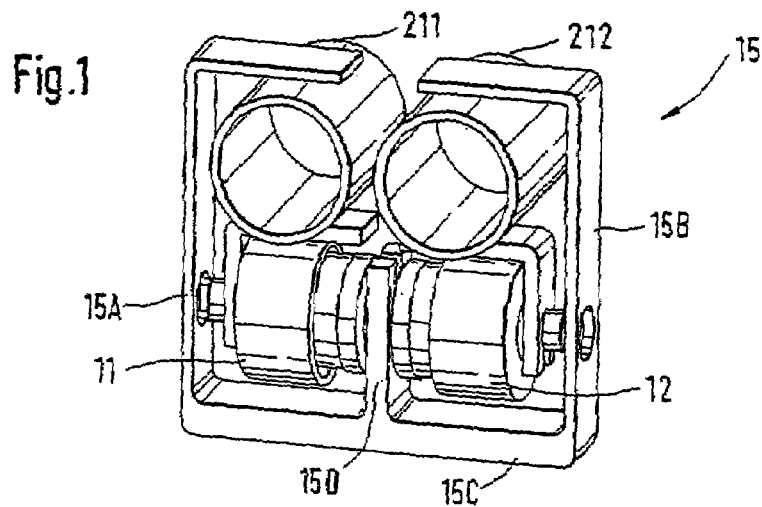
FIG. 1 is a perspective view of a first variant of a magnetic circuit arrangement particularly suited for Coriolis-type transducers.
Figure 2:
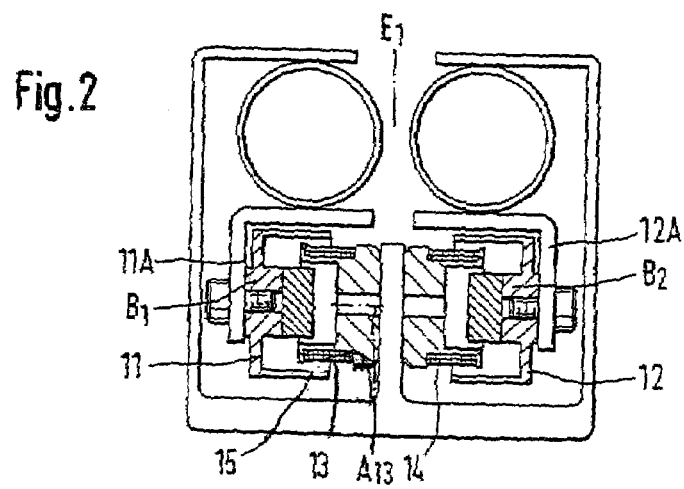
FIG. 2 is a part-sectional front view of the magnetic circuit arrangement of FIG. 1.
Figure 3:
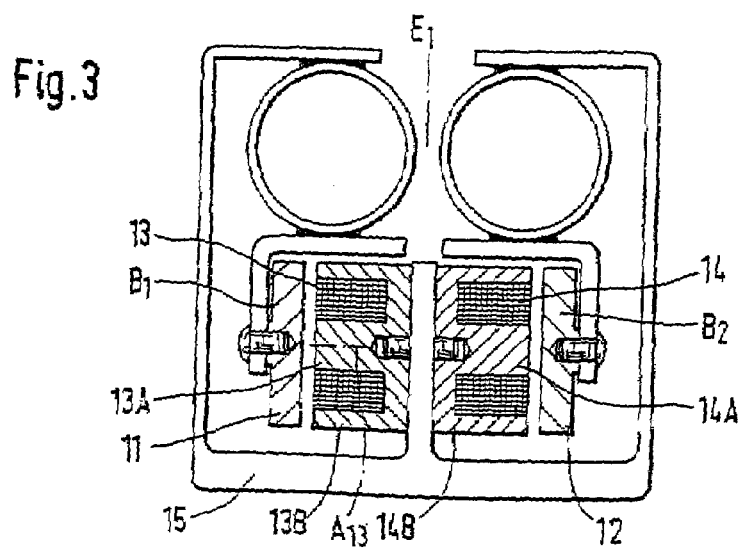
FIG. 3 is a part-sectional front view of a second variant of a magnetic circuit arrangement particularly suited for Coriolis-type transducers.
Figure 4:
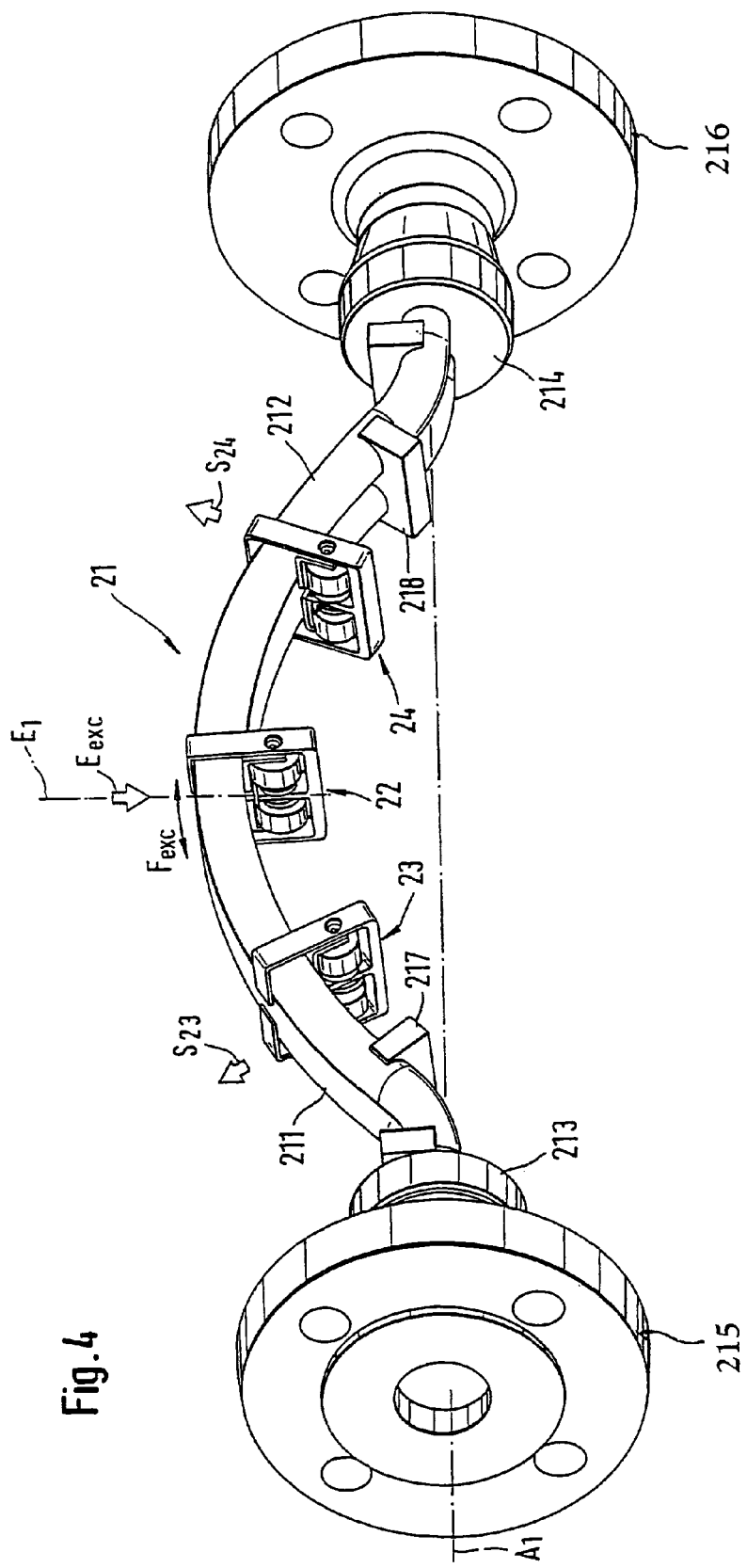
FIG. 4 is a perspective view of the magnetic circuit arrangement of FIG. 1, used in a transducer with a double flow tube configuration.

FIGS. 1 to 3 show embodiments of a magnetic circuit arrangement for converting electrical energy into mechanical energy and/or, based on the law of electromagnetic induction, for converting mechanical into electrical energy. The magnetic circuit arrangement is particularly suited for use in a Coriolis mass flowmeter or a Coriolis mass flowmeter-densimeter. A corresponding embodiment of a vibratory transducer, which responds to the mass flow rate m of a fluid flowing in a pipe (not shown), is shown in FIG. 4. As is well known, such a mass flow sensor, if used as a physical-to-electrical transducer in a Coriolis mass flowmeter, serves to produce and detect Coriolis forces in the fluid passing therethrough and to convert these forces into useful input signals for subsequent evaluation electronics.

To conduct the fluid to be measured, the transducer comprises a double flow tube configuration 21 with a first flow tube 211 and a second flow tube 212, which is preferably identical in shape to flow tube 211. As is usual with such transducers, flow tubes 211, 212 may be curved singly, e.g., U-shaped, or in the form of a loop; if necessary, however, they may also be straight.

Preferably, as shown in FIG. 4, flow tubes 211, 212 are so aligned relative to each other that an imaginary middle plane between the two tubes, which are preferably parallel to each other, corresponds to a first plane of symmetry of double flow tube configuration 21. Furthermore, double flow tube configuration 21 is advantageously shaped so as to have a second plane of symmetry that intersects the middle plane $E_1$, which also contains the above-mentioned vertical axis, particularly at right angles.

Each of the two flow tubes 211, 212 ends in an inlet manifold 213 and an outlet manifold 214. If the meter is installed in the fluid-conducting pipe, inlet manifold 213 and outlet manifold 214 are respectively connected with straight inlet-side and outlet-side sections of the pipe and are therefore preferably aligned with each other and with a longitudinal axis $A_1$ of double flow tube configuration 21 which joins the two, as is usual with such transducers. If the transducer is to be detachable from the pipe, a first flange 215 and a second flange 216 are preferably formed on inlet manifold 213 and outlet manifold 214, respectively; if necessary, however, inlet manifold 213 and outlet manifold 214 may also be connected with the pipe directly, e.g., by welding or brazing.

In operation, flow tubes 211, 212, as mentioned above, are excited in the useful mode into flexural vibrations, particularly at a natural resonance frequency of an eigenmode, such that they vibrate in phase opposition, as is usual with such transducers. As is well known, the Coriolis forces thus induced in the fluid passing through flow tubes 211, 212 cause an additional elastic deformation of the tubes, also referred to as the Coriolis mode, which is superimposed on the excited vibrations of the useful mode and is also dependent on the mass flow rate m to be measured.

If necessary, any mechanical stresses caused by the vibrating flow tubes 211, 212 in inlet manifold 213 and outlet manifold 214 can be minimized, for example, by mechanically joining the tubes by means of at least a first node plate 217 at the inlet end and at least a second node plate 218 at the outlet end, as is usual with such transducers.

To drive flow tubes 211, 212, the transducer comprises at least one vibration exciter 22. The latter serves to convert electric excitation energy $E_{exc}$, supplied from control electronics of, e.g., the above-mentioned mass flowmeter, into excitation forces $F_{exc}$, e.g., pulsating or harmonic excitation forces, which act on flow tubes 211, 212 symmetrically, i.e., simultaneously and uniformly, but in opposite directions, thus producing the antiphase vibrations of flow tubes 211, 212. The excitation forces $F_{exc}$ may be adjusted in amplitude, e.g., by means of a current- and/or voltage-regulator circuit, and in frequency, e.g., by means of a phase-locked loop, in the manner familiar to those skilled in the art, see also U.S. Pat. No. 4,801,897.

To detect vibrations of flow tubes 211 and 212, the transducer comprises an inlet-side first vibration sensor 23 and an outlet-side second vibration sensor 24, which respond to motions of the tubes, particularly to their lateral deflections, and deliver corresponding first and second vibration signals $S_{23}$ and $S_{24}$, respectively.

In transducers of the kind described, the magnetic circuit arrangement according to the invention, if used as vibration exciter 22, may serve to produce the excitation forces $F_{exc}$ driving the flow tubes 211, 212. Furthermore, the magnetic circuit arrangement, as mentioned above, may be used as vibration sensor 23 or 24 for sensing the motions of flow tubes 211, 212 and for generating vibration signal $S_{23}$ or $S_{24}$, respectively.

To interconvert mechanical and electric energy, the magnetic circuit arrangement comprises at least a first, preferably cylindrical, coil 13, which is traversed in operation by a current and which is attached to double flow tube configuration 21 by means of a holder 15. Preferably, a second coil 14, particularly a coil aligned with coil 13, is fixed to holder 15.

Furthermore, the magnetic circuit arrangement comprises a first armature 11, which is fixed to flow tube 211 and which in operation interacts with the current-carrying coil 13 via a first magnetic field $B_1$, and a second armature 12, particularly an armature identical in shape to armature 11, which is fixed to flow tube 212 and can interact with coil 14 via a second magnetic field $B_2$. Magnetic field $B_1$ may be, for example, an alternating field which is produced by means of coil 13 and on which a steady field produced by means of armature 11 may be modulated; analogously, magnetic field $B_2$ may be produced by means of coil 14 and armature 12, for example.

The two armatures 11, 12 also serve to homogenize magnetic fields produced by the magnetic circuit arrangement, particularly magnetic field $B_1$ and magnetic field $B_2$, also outside coil 13, and to concentrate these fields within as narrow a space as possible which lies essentially within the magnetic circuit arrangement itself. Armatures 11, 12 also serve to shape and direct the aforementioned magnetic fields in such a manner that they have as high a flux density as possible, particularly a constant flux density, even in air. Therefore, armatures 11, 12 are preferably made at least in part of ferromagnetic material, which, as is well known, has a very high permeability and thus concentrates magnetic fields.

In a preferred embodiment of the invention, armature 11 also serves to produce a permanent steady component of magnetic field $B_1$; analogously, a permanent steady component of magnetic field $B_2$ is preferably produced by means of armature 12. Particularly in that case, armatures 11, 12 are made at least in part of hard magnetic, i.e., premagnetizable, material, such as AlNiCo, NyFeB, SmCo, or another rare-earth alloy. It is also possible to use far less expensive free-cutting steel or structural steel as the material for this embodiment of armatures 11, 12.

As shown in FIGS. 1 to 3, armature 11 is rigidly fixed to flow tube 11 by means of a mounted-on, flexurally stiff first angle piece 11A, and armature 12 is rigidly fixed to flow tube 212 by means of a mounted-on, flexurally stiff second angle piece 12A. Angle pieces 11A and 12A may be joined to flow tubes 211 and 212, respectively, by welding or brazing, for example.

As shown in FIG. 1, for example, coil 13, and also coil 14 if present, is fixed by means of holder 15 to both flow tubes 211, 212, such that an axis of symmetry of the magnetic circuit arrangement is virtually parallel to middle plane $E_1$ of double flow tube configuration 21. Preferably, holder 15 is fixed to flow tube 211 via a first leg 15A and to flow tube 212 via an essentially identically shaped second leg 15B. Furthermore, the two, preferably resilient, legs 15A, 15B are, preferably rigidly, interconnected at the respective ends remote from double flow tube configuration 21 via a support plate 15C. Holder 15 may either be a single part, such as a bent stamping, or be of multipart construction. It may be made of the same materials as those used for flow tubes 211, 212, for example.

If flow tubes 211, 212 vibrate in phase opposition in the manner described above, holder 15 will be deformed, particularly by lateral deflection of legs 15A, 15B attached to flow tubes 211, 212, but its symmetry axis will essentially remain in its position relative to middle plane $E_1$. Thus, coil 13, held by support plate 15C, e.g., via a ridge portion 15D formed on the latter, is float-mounted to double flow tube configuration 21 and kept at an essentially constant distance from middle plane $E_1$.

To prevent the vibration mode shape of the vibrating flow tubes 211, 212 from being influenced by holder 15, the latter must be made pliable. To accomplish this, legs 15A, 15B, which also vibrate in operation, may be formed from suitably thin sheet-metal strip.

Figure 5:
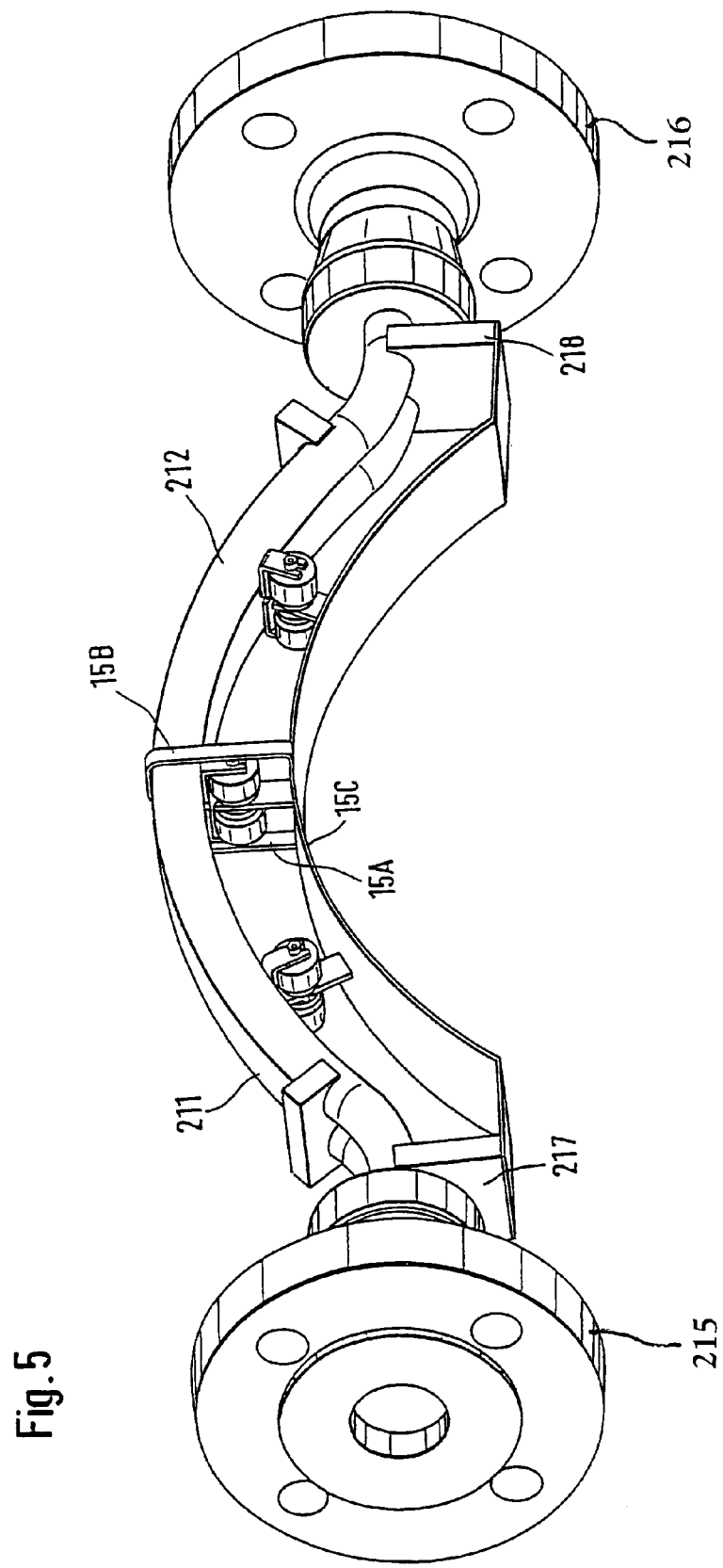
FIGS. 5 and 6 are perspective views of further developments of the magnetic circuit arrangement according to the invention, used in a transducer.
Figure 6:
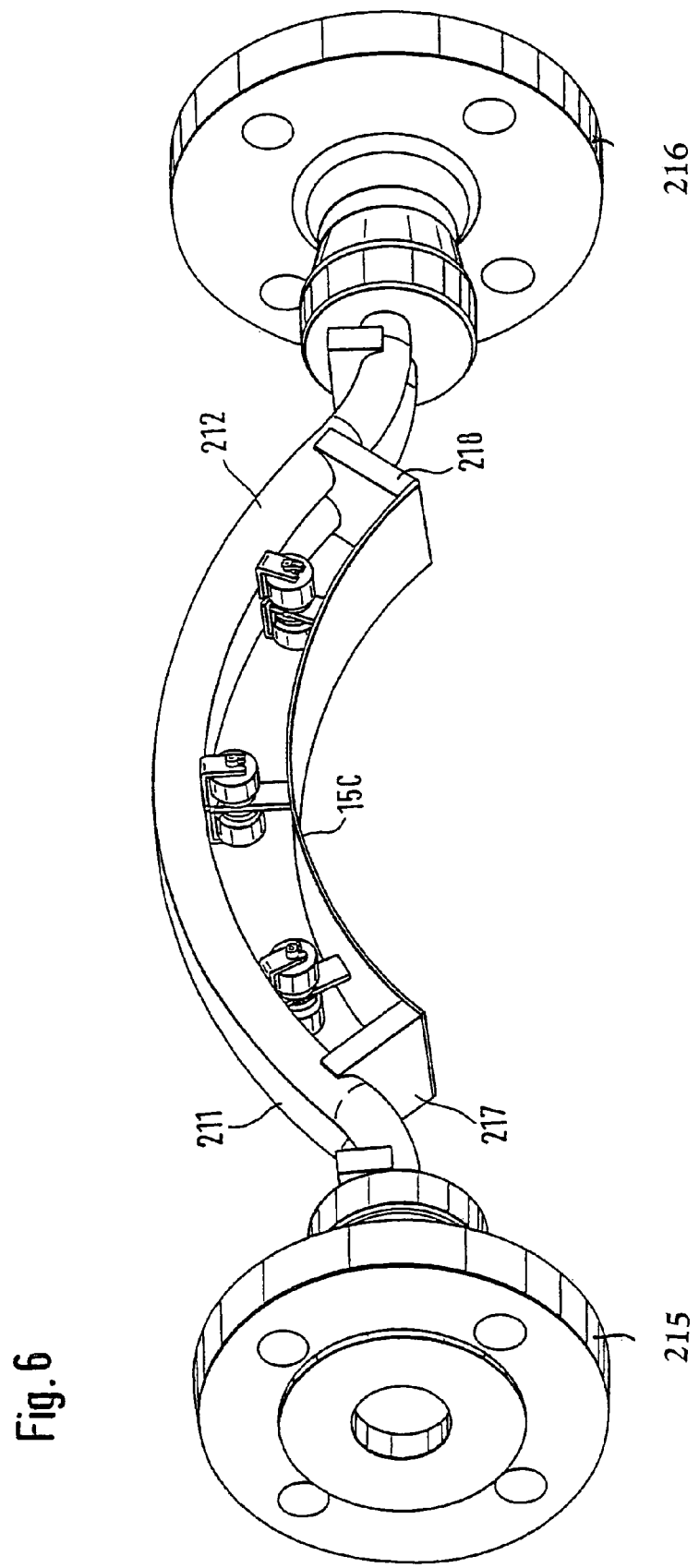

In another embodiment of the invention, support plate 15C, as shown schematically in FIG. 5 or 6, is shaped and attached to flow tubes 211, 212 in such a way as to extend essentially parallel to the flow tubes and virtually along the entire length of double flow tube configuration 21. In that case, support plate 15C is advantageously fastened directly to node plate 217 at the inlet end and to node plate 218 at the outlet end. To the inventors' surprise it turned out that, if the, e.g., thermally induced, expansions of flow tubes 211, 212 are parallel to the middle plane $E_1$, the holder 15 so fixed can follow these expansions to the point that any relative shift between holder 15 and double flow tube configuration 21 is negligibly small.

A particular advantage of this embodiment of the invention is that it eliminates the need to additionally fix holder 15 to double flow tube configuration 21 via legs 15A, 15B, cf. FIG. 6.

According to a first variant of the invention, the magnetic circuit arrangement is of the electrodynamic type, i.e., an arrangement in which an electric conductor formed into a loop, e.g., coil 13, is penetrated, particularly perpendicularly, by a magnetic field produced by at least one permanent magnet, and in which the loop and the permanent magnet are moved relative to each other. To this end, coil 13 is preferably fixed to double flow tube configuration 21 by means of holder 15 in such a way that its central axis $A_{13}$ is essentially perpendicular to middle plane $E_1$.

To homogenize the magnetic field $B_1$, $B_2$ and fix as high a flux density as possible, particularly outside armatures 11, 12, in a preferred embodiment of the first variant of the invention, each of the two armatures 11, 12, as shown schematically in FIGS. 1 and 2, has the form of a cup whose bottom has a, preferably hard magnetic, rod formed thereon which is coaxial with the wall of the cup.

In another preferred embodiment of the first variant, armatures 11, 12, as is usual with such magnetic circuit arrangements, are preferably made at least in part, i.e., in the region of the above-mentioned wall of the cup, of soft magnetic material, such as ferrite or Corovac.

According to a second variant of the invention, the magnetic circuit arrangement is of the electromagnetic type, i.e., an arrangement in which two ferromagnetic bodies movable relative to each other are so arranged relative to each other that at least one variable air gap formed between the two is penetrated by a, preferably homogeneous, magnetic field of high flux density, cf. particularly EP-A 803 713.

In this second variant of the invention, the magnetic circuit arrangement further comprises a ferromagnetic first core 13A for coil 13, the core being fixed to holder 15. As shown in FIG. 3, core 13A, extending through at least part of coil 13, is located opposite to and spaced from armature 11. In this second variant of the invention, core 13A and armature 11 serve to form a variable first air gap, across which the magnetic field $B_1$ extends at least in part. Preferably, the magnetic circuit arrangement further comprises a ferromagnetic second core 14A for coil 14, this second core being also fixed to holder 15 at a distance from armature 12. Thus, core 14A and armature 12 form a variable air gap, particularly an air gap penetrated by magnetic field $B_2$.

To produce permanent steady components of the magnetic fields and attenuate eddy currents in the magnetic circuit arrangement, each of cores 13A is preferably made at least in part of hard magnetic, but poorly conducting material, such as of any one of the aforementioned rare-earth alloys AlNiCo, NyFeB, SmCo, etc.

To fix a reluctance for magnetic field $B_1$ that is as low as possible even outside core 13A, in a preferred embodiment of the second variant of the invention, a ferromagnetic first yoke 13B extending outside coil 13 is formed integrally with core 13A, as shown in FIG. 13; analogously, core 14A may have a ferromagnetic second yoke 14B for magnetic field $B_2$ formed thereon, which is preferably identical in shape to yoke 13B. Advantageously, as is usual with such magnetic circuit arrangements, yoke 13B, 14B may be made of soft magnetic materials, such as ferrite or Corovac.

In a further preferred embodiment of the invention, core 13A and yoke 13B are shaped and aligned relative to each other in such a way that the free end faces of core 13A and yoke 13B which are in contact with the air gap are essentially flat and coplanar. Then, the free end face of armature 11 that is in contact with the air gap will preferably also be flat. In that case, this end face may also be parallel to the opposite free end faces of core 13A and yoke 13B, for example. If necessary, armature 11, core 13A, and yoke 13B may be constructed on the coil-and-plunger principle.

In a further preferred embodiment of the second variant of the invention, yoke 13B is designed as a coil can, particularly as a can coaxial with coil 13, cf. EP-A 803 713.

Further details and embodiments concerning the operation of a magnetic circuit arrangement according to the second variant of the invention or concerning the shape and arrangement of coil 13 and yoke 13B, and of coil 14 and yoke 14B if present, are disclosed, for example, in applicant's EP-A 803 713, which is therefore incorporated herein by reference.

The invention claimed is:

1. A magnetic circuit arrangement for converting electrical energy into mechanical energy and/or vice versa, the arrangement being adapted for use with a first vibrating flow tube and a second vibrating flow tube of a transducer, the arrangement comprising:
    at least a first coil, traversed in operation by a current;
    a first armature, fixed to the first vibrating flow tube of the transducer;
    a second armature, fixed to the second vibrating flow tube of the transducer; and
    a holder for said first coil, fixed to the first and second flow tubes, wherein:
    said first armature and said second armature are shaped and aligned relative to each other in such a way that magnetic fields produced by means of the magnetic circuit arrangement are essentially concentrated- within the magnetic circuit arrangement; and
    said first coil and at least said first armature interact via a first magnetic field.

2. A magnetic circuit arrangement as set forth in claim 1, further comprising:
    a second coil traversed in operation by a current, wherein:
    said second coil and said second armature interact via a second magnetic field.

3. A magnetic circuit arrangement as set forth in claim 1, wherein:
    at least said first armature is shaped and aligned relative to said first coil in such a way that the first magnetic field spreads homogeneously at least at the side of said first coil and essentially in alignment with a central axis ($A_{13}$) of said first coil.

4. A magnetic circuit arrangement as set forth in claim 1, wherein:
    said first armature and said second armature are cup-shaped.

5. A magnetic circuit arrangement as set forth in claim 1, wherein:
    said first coil is wound on a first core; and said first core and said first armature are shaped and aligned relative to each other in such a way that a magnetic flux passes through an air gap formed between the two.

6. A magnetic circuit arrangement as set forth in claim 5, wherein:
said first core is cup-shaped.

7. A magnetic circuit arrangement as set forth in claim 1, wherein:
said holder comprises a support plate for holding said at least first coil;
said support plate is float-mounted by means of a resilient first leg, fixed to the first flow tube and by means of a resilient second leg, fixed to the second flow tube; and
the two flow tubes forming a double flow tube configuration.

8. A magnetic circuit-arrangement as set forth in claim 7, wherein:
said support plate, extending along the double flow tube configuration, is fixed to the first and second flow tubes at the inlet and outlet ends thereof.

9. A magnetic circuit arrangement as set forth in claim 1, wherein: the transducer is a Coriolis mass flow sensor.

10. The use of the magnetic circuit arrangement as set forth in claim 1 as a vibration exciter for driving the flow tubes.

11. The use of the magnetic circuit arrangement as set forth in claim 1 as a vibration sensor for detecting vibrations of the flow tubes.

* * * * *